J. F. DURYEA.
FASTENING DEVICE FOR AUTO HOODS.
APPLICATION FILED MAY 5, 1913.
1,100,292.
Patented June 16, 1914.
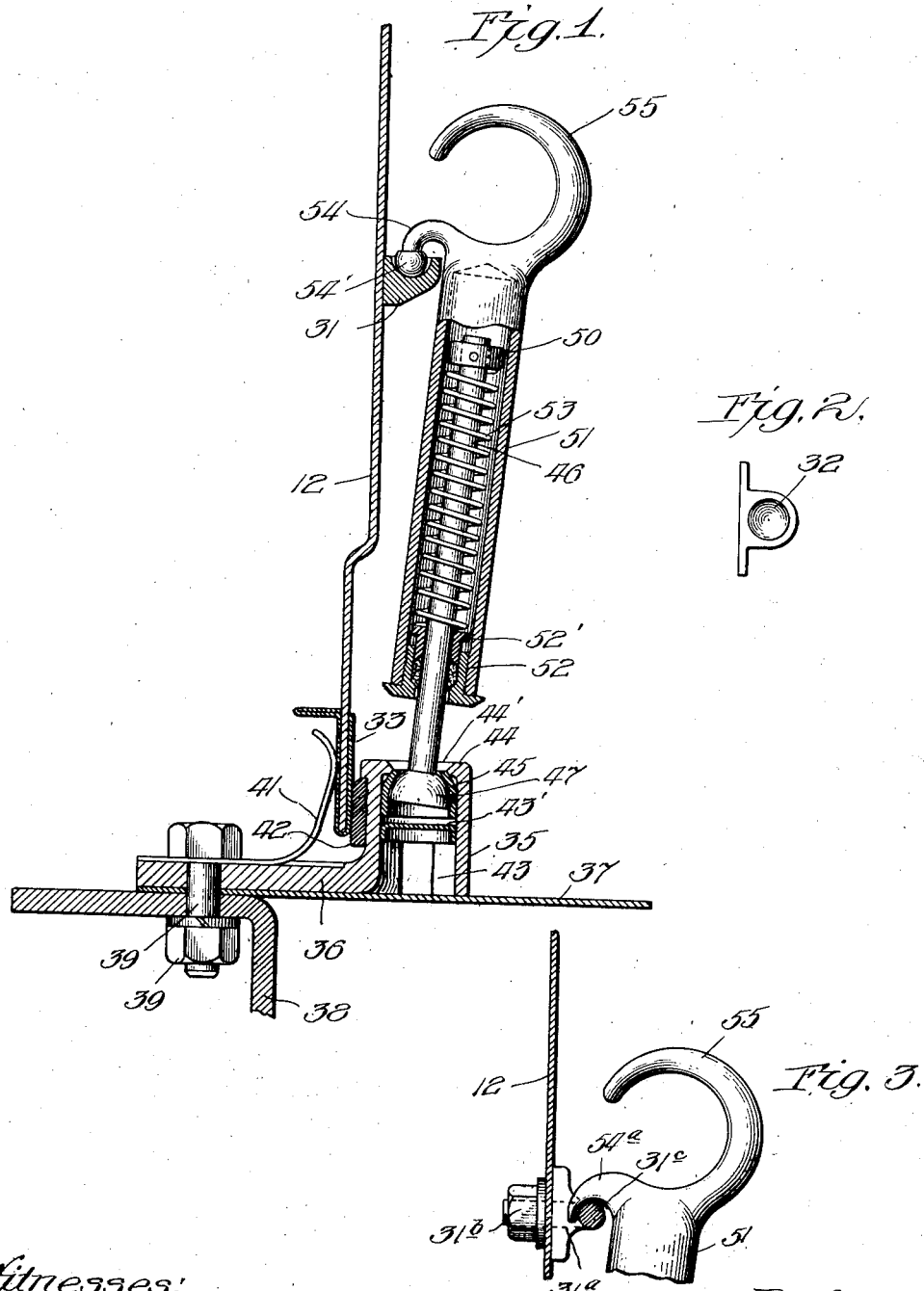

UNITED STATES PATENT OFFICE.

JAMES F. DURYEA, OF SPRINGFIELD, MASSACHUSETTS, ASSIGNOR TO STEVENS-DURYEA COMPANY, OF CHICOPEE FALLS, MASSACHUSETTS, A CORPORATION OF MASSACHUSETTS.

FASTENING DEVICE FOR AUTO-HOODS.

1,100,292.   Specification of Letters Patent.   Patented June 16, 1914.

Original application filed October 19, 1912, Serial No. 726,690. Divided and this application filed May 5, 1913. Serial No. 765,556.

*To all whom it may concern:*

Be it known that I, JAMES F. DURYEA, a citizen of the United States, residing at Springfield, in the county of Hampden and State of Massachusetts, have invented certain new and useful Improvements in Fastening Devices for Auto-Hoods, of which the following is a specification.

This invention relates to improvements in fastening devices, and has for an object to provide a fastening device especially adapted for use in connection with an automobile hood where it is desired to detachably secure the same in closed position.

Another object of this invention is to provide a fastening device which will permit sliding movement of the hood at the same time securing the same in closed position.

It has been found that where fastening means have been provided to secure the hood of an automobile in rigid closed position, the warping or twisting of the frame will cause buckling and bending of the hood, due to its rigid retention in closed position.

It is the object of this invention to provide a fastening device which will permit slight sliding movement of the hood and it is especially adapted for use in connection with a style of hood shown in my co-pending application No. 726,690, of which this is a division.

Other objects are set forth and made apparent in the following specification and accompanying drawings, in which:

Figure 1 is a sectional view partially in elevation of a form of my device securing the hood in closed position; Fig. 2 is a detail of the engageable member carried by the hood; Fig. 3 is a detail and slight modification.

Like numerals refer to like elements throughout the drawings, in which—

12 designates a portion of an automobile hood provided with a wearing strap 33 fitting between the spring clip 41 and a deadening piece 42 when in closed position; 38 designates a portion of an automobile frame from which projects outwardly and to which is secured the plate 37. Located upon this plate 37 and secured to the frame member 38 by the bolt 39 and nut 39', is the socket member 35 formed with the flange 36. The socket member 35 is provided with a central bore 43 in which is provided the stop cap 43'. Located in the upper portion of the bore 43 is the wearing sleeve 45, inwardly curved at its upper portion as shown in Fig. 1. The socket member 35 is provided with the internal upper flange 44 and the aperture or top opening 44' communicating with the bore 43.

The fastening device proper comprises a cylinder member 51 provided with the gland or stuffing box 52 at its lower open end and formed at its upper end with the outwardly and downwardly depending finger 54 rounded in the form shown in Fig. 1 at 54'. The upper end of the cylinder member 51 is also provided with the engageable portion or loop 55 adapted to be engaged by the finger of the operator, as will be apparent.

A piston or collar 50 is reciprocably mounted in the cylinder 51 and is carried by the piston rod 46, provided at its lower end with the partially rounded or ball shaped portion 47, coacting with the socket member 35 and wearing collar 45 to form a ball and socket or swivel mounting, the collar 45 serving to provide for wear and to prevent the accidental removal of the piston rod 46 from the socket member. A coil spring 53 is located around the rod 46 and extends between the gland follower member 52' and the collar 50 and serves to maintain the collar or piston normally in position at the upper end of the cylinder 51. A cup or engageable member 31 is carried by the hood 12 and is provided with a socket or cup 32 therein in which is adapted to seat the portion 54' of the finger 54. The operation of this device is so simple as to need no detailed explanation. It is merely sufficient to remark that the spring 53 serves to provide a yielding element between the cylinder member 51 and the socket member 35 so that slight yielding movement of the hood will be permitted, although the same will be normally retained in closed position.

The modification shown in Fig. 3 consists in providing a U shaped engageable member 31ª secured by nuts 31ᵇ to the head 12 and provided with the portion 31ᶜ engageable by an outwardly extending spur or finger 54ª as shown in the drawings.

While I have shown and described my invention with more or less particularity, I do not wish to be unduly restricted to such showing beyond the scope of the appended claims.

What I claim is:—

1. In a device of the class described, an engaging member, comprising a cylinder and a piston, said piston being provided with a rod, means to secure said rod in swivel relation to a fixed support, said cylinder being provided with an engaging portion and an engageable portion, and a yielding means interposed between said cylinder and said piston.

2. In a device of the class described, an engaging member comprising a cylinder and a piston, said piston being provided with a rod, means to secure said rod in swivel relation to a fixed support, said cylinder having formed integrally therewith an engaging finger and handle portion, and a yielding means interposed between said cylinder and said piston.

3. In a device of the class described, in combination with a fixed support and a movable element adapted to be secured to said support, a fastening member comprising a cylinder and a piston carried by a piston rod, means to secure said rod in swivel position on said fixed support, said cylinder being provided with an engaging member formed integrally therewith, yielding means interposed between said cylinder and said piston, an engagable member carried by said movable element, said engaging portion of said cylinder being adapted to engage said member whereby said movable element may be yieldingly secured to said fixed support.

4. The combination with an automobile frame, a hood having a holding member secured thereto, a clamping member secured to said automobile frame by a ball and socket member, said clamping member being adapted to yieldably engage said holding member to retain said hood in position in such manner that it may move laterally with respect to said automobile frame.

5. In combination with an automobile frame, and a hood mounted so as to be capable of movement laterally with respect to said frame, a clamping member carried by ball and socket connection on said frame, said clamping member having an outwardly projecting finger, said hood being provided with a cup member secured thereto, said finger of said clamping member being adapted to engage and coact with said cup member to hold said hood in closed position, said clamping member comprising a piston member and a cylinder member with yieldable means therebetween, whereby when said clamping member is in engagement with said cup member of said hood, the latter will be permitted to move laterally with respect to said frame.

In testimony whereof, I have subscribed my name.

JAMES F. DURYEA.

Witnesses:
LILLIAN BEAUDEAU,
RICHARD GOURLEY.